(12) United States Patent
Kuryu

(10) Patent No.: US 7,975,804 B2
(45) Date of Patent: Jul. 12, 2011

(54) LUBRICATING STRUCTURE FOR TRANSMISSION

(75) Inventor: Kenji Kuryu, Nishio (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 583 days.

(21) Appl. No.: 12/078,344

(22) Filed: Mar. 28, 2008

(65) Prior Publication Data
US 2008/0251324 A1 Oct. 16, 2008

(30) Foreign Application Priority Data

Apr. 10, 2007 (JP) ................................. 2007-102635

(51) Int. Cl.
*F16H 57/04* (2010.01)

(52) U.S. Cl. ..................................................... 184/6.12
(58) Field of Classification Search .................. 184/6.12, 184/11.2, 13.1; 475/159, 160; 474/8–28; 74/467; 62/468–475
See application file for complete search history.

(56) References Cited

U.S. PATENT DOCUMENTS

| | | | |
|---|---|---|---|
| 2,165,448 A * | 7/1939 | Browne | 417/409 |
| 4,987,974 A * | 1/1991 | Crouch | 184/6.12 |
| 6,533,072 B2 * | 3/2003 | Hori | 184/6.25 |
| 7,264,564 B2 * | 9/2007 | Walter | 474/28 |
| 2005/0192697 A1* | 9/2005 | Walter | 700/116 |
| 2006/0191746 A1* | 8/2006 | Diosi et al. | 184/6.18 |
| 2006/0287152 A1* | 12/2006 | Bishop et al. | 475/159 |
| 2009/0139262 A1* | 6/2009 | Takahashi et al. | 62/468 |

FOREIGN PATENT DOCUMENTS

| | | | |
|---|---|---|---|
| JP | 2000-81117 A | | 3/2000 |
| WO | WO0107762 A1 * | | 2/2001 |

* cited by examiner

*Primary Examiner* — Michael R Mansen
*Assistant Examiner* — Robert T Reese
(74) *Attorney, Agent, or Firm* — Buchanan Ingersoll & Rooney PC

(57) ABSTRACT

A lubricating structure for a transmission includes an axial hole formed penetrating through a gear shaft in an axial direction thereof and having a first opening at one axial end of the gear shaft for supplying therein a lubricant and a second opening at the other axial end thereof, a first oil hole provided on the gear shaft in a radial direction thereof to establish communication between the axial hole and an outside of the gear shaft, and a tapered groove provided on an inner wall of the axial hole in the axial direction thereof, wherein the lubricant is supplied to a portion needing lubrication via the axial hole or via the axial hole and the first oil hole, and the tapered groove is deeper at the second opening side than the first opening side.

17 Claims, 5 Drawing Sheets

Flow of lubricating oil
(A size of the arrows indicates an amount of the lubricating oil.)

Lubricating oil in the tapered groove

F I G. 4
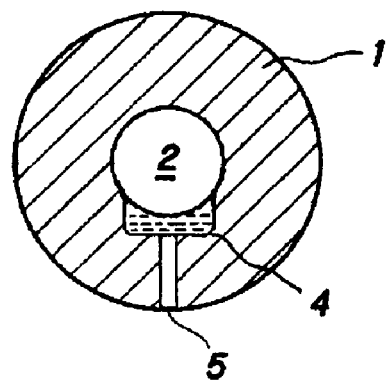

US 7,975,804 B2

LUBRICATING STRUCTURE FOR TRANSMISSION

CROSS REFERENCE TO RELATED APPLICATIONS

This application is based on and claims priority under 35 U.S.C. §119 to Japanese Patent Application 2007-102635, filed on Apr. 10, 2007, the entire content of which is incorporated herein by reference.

FIELD OF THE INVENTION

This invention generally relates to a lubricating structure for a transmission.

BACKGROUND

A lubricating structure for a transmission disclosed in JP2000-81117A includes an axial hole formed penetrating through a gear shaft in an axial direction thereof to establish communication therethrough and plural oil holes provided on the gear shaft in a radial direction thereof to establish communication between the axial hole and an outside of the gear shaft. Through the plural oil holes, lubricant is supplied, for example, to a transmission gear fitted onto the gear shaft.

In FIG. 5, a direction of each arrow indicates a direction of a lubricant flow and a size of each arrow indicates an amount of the lubricant.

Referring to FIG. 5, the lubricant supplied from a right side (i.e., an upstream side) of the axial hole 12 is subject to a centrifugal force of rotation of the gear shaft 11 and flows out of the oil holes 13 due to the centrifugal force. Thus, a portion 10 needing lubrication, for example, a bearing, provided at a left side (i.e., a downstream side) of the axial hole 12, may not be sufficiently lubricated.

A need thus exists for a lubricating structure for a transmission, which is not susceptible to the drawback mentioned above.

SUMMARY OF THE INVENTION

In light of the foregoing, a lubricating structure for a transmission includes an axial hole formed penetrating through a gear shaft in an axial direction thereof and having a first opening at one axial end of the gear shaft for supplying therein a lubricant and a second opening at the other axial end of the gear shaft, a first oil hole provided on the gear shaft in a radial direction thereof to establish communication between the axial hole and an outside of the gear shaft, and a tapered groove provided on an inner wall of the axial hole of the gear shaft and extending in the axial direction thereof, the tapered groove being gradually tapered from a first opening side towards a second opening side, wherein the lubricant is supplied to a portion needing lubrication via the axial hole or the lubricant is supplied to the portion needing lubrication via the axial hole and the first oil hole, and the depth of the tapered groove is deeper at the second opening side than that of the first opening side.

BRIEF DESCRIPTION OF THE DRAWINGS

The foregoing and additional features and characteristics of the present invention will become more apparent from the following detailed description considered with reference to the accompanying drawings, wherein:

FIG. 4 is an enlarged cross-sectional view taken on line IV-IV of FIG. 3; and

DETAILED DESCRIPTION

A first embodiment of the present invention will be described below with reference to the attached drawings.

Figure 1:
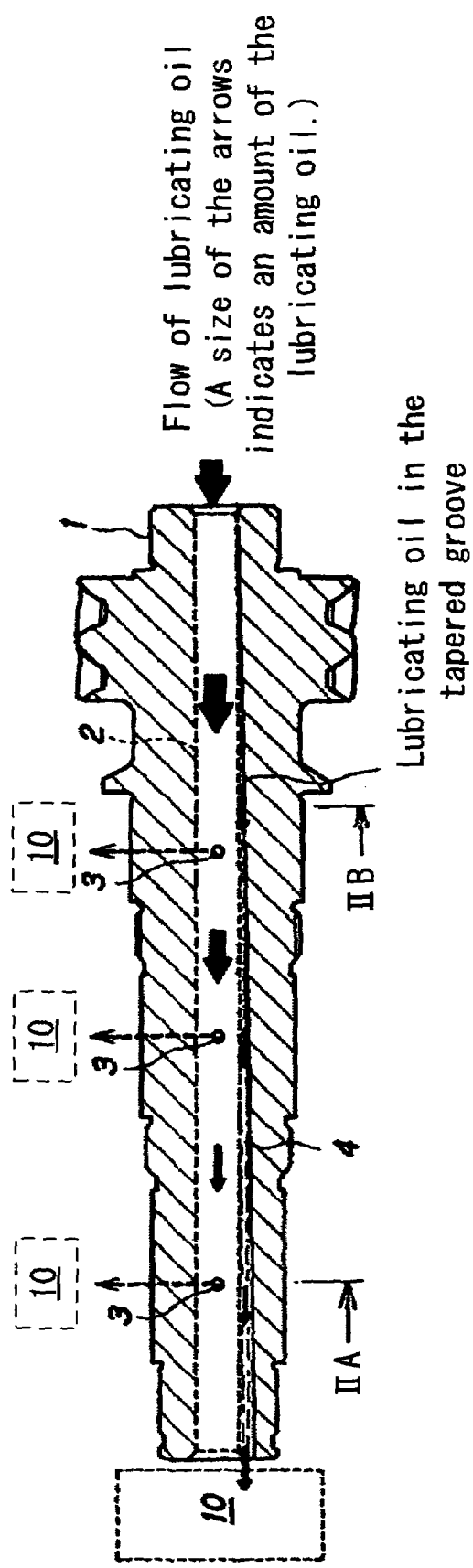
FIG. 1 is a cross-sectional view illustrating a lubricating structure for a gear shaft according to a first embodiment of the present invention.
Figure 2A:
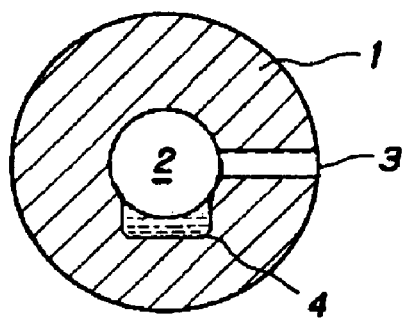
FIG. 2A is an enlarged cross-sectional view taken on line II A-II A of FIG. 1.
Figure 2B:
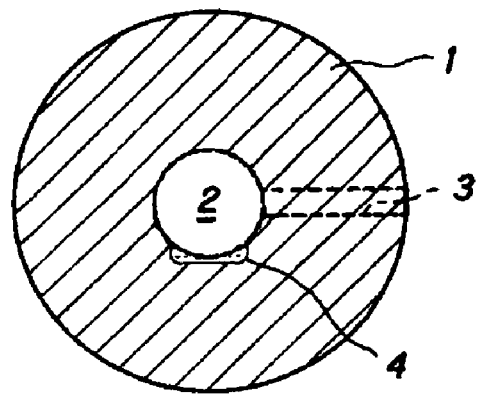
FIG. 2B is an enlarged cross-sectional view taken on line II B-II B of FIG. 1.

As shown in FIG. 2A and FIG. 2B, a lubricating structure according to the first embodiment of the present invention includes an axial hole 2 formed penetrating through a gear shaft 1 in an axial direction thereof and having a first opening at one axial end of the gear shaft for supplying therein a lubricant, for example, a lubricating oil, and a second opening at the other axial end of the gear shaft, and plural first oil holes 3 provided on the gear shaft 1 in a radial direction thereof to establish communication between the axial hole 2 and an outside of the gear shaft 1. The lubricating structure according to this embodiment further includes a tapered groove 4 provided on an inner wall of the axial hole 2 of the gear shaft 1 and extending in the axial direction thereof. The tapered groove 4 is gradually tapered from a first opening side (i.e., a right side in FIG. 1) in which the lubricating oil is supplied, towards a second opening side (i.e., a left side in FIG. 1) adjacent to which a portion 10 needing lubrication is positioned, wherein the depth of the tapered groove 4 is deeper at the second opening side than that of the first opening side. The tapered groove 4 is separately positioned from the first oil hole 3 not to be in communication therewith, that is, the axial hole 2 and the first oil holes 3 are not in communication with each other.

Next, a function of the lubricating structure of the gear shaft 1 according to the first embodiment is explained. The lubricating oil fed into the axial hole 2 is subject to a centrifugal force of rotation of the gear shaft 1 and is distributed to the inner wall of the axial hole 2, part of which is trapped in the tapered groove 4. By means of the tapered groove 4 whose depth is deeper at the second opening side than that at the first opening side, the lubricating oil under the centrifugal force flows towards the first opening side of the axial hole 2. Consequently, a sufficient amount of the lubricating oil is supplied to the portion 10 needing the lubrication and positioned near the second opening.

Next, a lubricating structure of the gear shaft 1 according to a second embodiment is explained. Descriptions of identical structural features to those of the first embodiment are omitted and differences between the first embodiment and the second embodiment are described.

Figure 3:
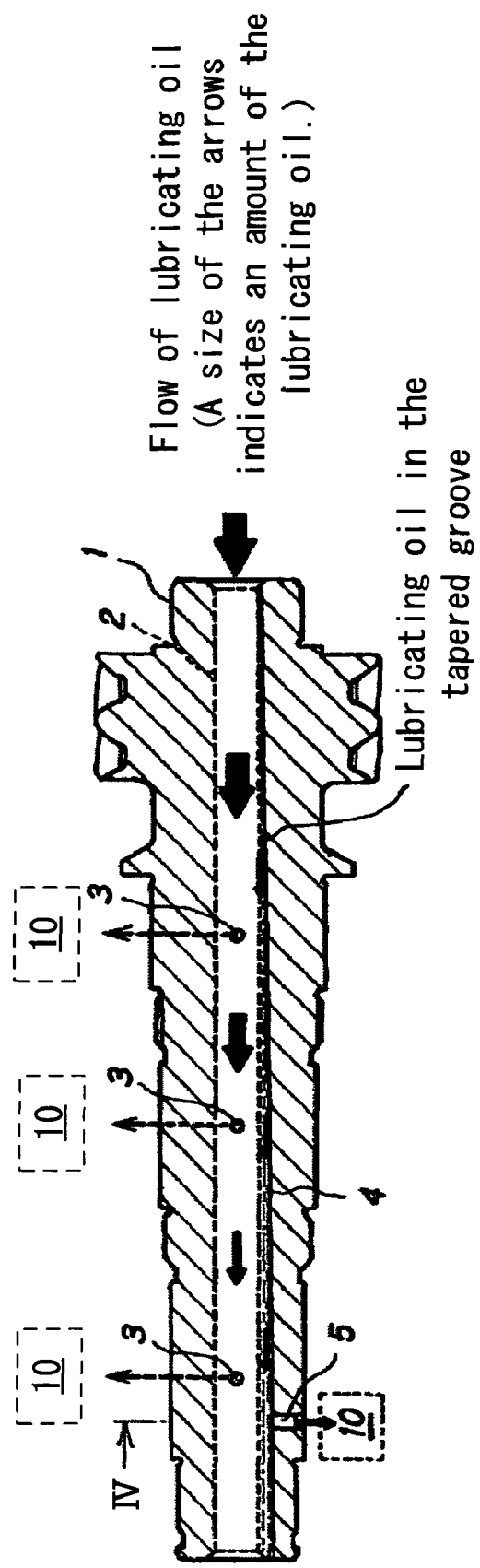
FIG. 3 is a radial cross-sectional view illustrating a lubricating structure for a gear shaft according to a second embodiment of the present invention.
Figure 5:
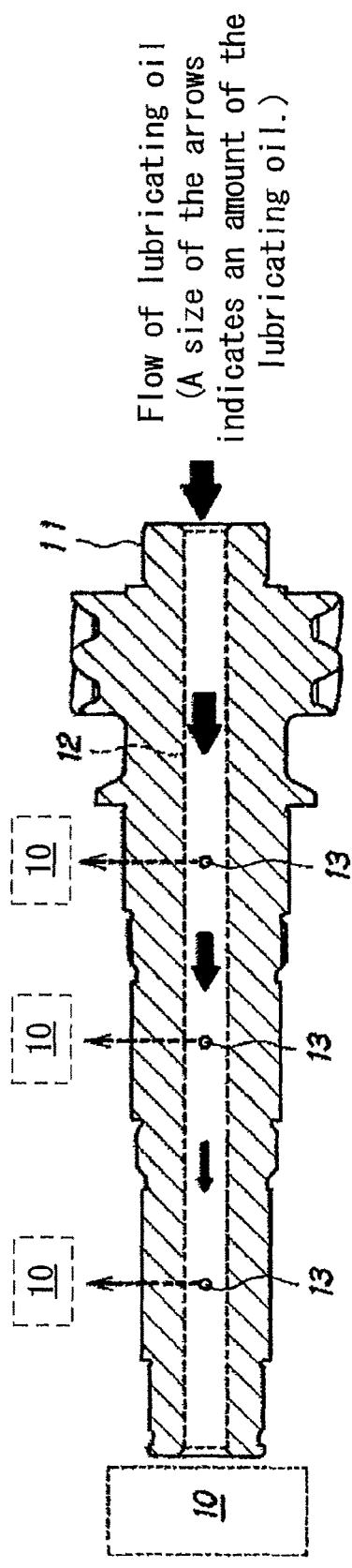
FIG. 5 is a view describing a known lubricating structure for a gear shaft.

As shown in FIG. 3 and FIG. 4, the lubricating structure according to the second embodiment of the present invention includes a second oil hole 5 provided on the gear shaft 1 in the radial direction thereof, between the first opening and the second opening and communicating with the tapered groove 4 for supplying the lubricating oil to the portion 10 needing the lubrication and positioned outside the gear shaft 1 in the radial direction thereof. With this structure, the lubricating oil is supplied from the second oil hole 5, via the tapered groove 4, to the portion 10 needing the lubrication and positioned between the first opening side and the second opening side of the tapered groove 4.

The lubricating structure of the gear shaft 1 according to each of the first embodiment and the second embodiment of the present invention is adapted to a transmission mounted on a vehicle, more particularly, to a transmission having a portion needing the lubrication, such as a bearing rotatably supporting the gear shaft 1, positioned near the second side of the gear shaft 1.

According to each of the first embodiment and the second embodiment of the present invention, the lubricating oil fed into the axial hole 2 is subject to the centrifugal force of rotation of the gear shaft 1 and is distributed to the inner wall of the axial hole 2, part of which is trapped in the tapered groove 4. By means of the tapered groove 4 whose depth is deeper at the second opening side than that at the first opening side of the gear shaft 1, the lubricating oil under the centrifugal force flows towards the second opening side of the axial hole 2. Consequently, the sufficient amount of the lubricating oil is supplied to the portion 10 needing the lubrication and positioned near the second opening.

According to each of the first embodiment and the second embodiment of the present invention, the tapered groove 4 is separately positioned from the first oil hole 3 not to be in communication therewith. Consequently, it is prevented that an excessive amount of lubricating oil flows out of the first oil holes 3 as a result of providing the tapered groove 4.

According to the second embodiment of the present invention, the lubricating structure for the transmission further includes the second oil hole 5 provided on the gear shaft 1 in the radial direction thereof between the first opening and the second opening to establish communication between the tapered groove 4 and the outside of the gear shaft 1 for supplying the lubricating oil to the portion 10 needing the lubrication. Consequently, the lubricating oil is supplied from the second oil hole 5 to the portion 10 needing the lubrication and positioned outside the gear shaft 1, between the first opening and the second opening, via the tapered groove 4.

According to the second embodiment of the present invention, the second oil hole is positioned closer to the second opening side than the first oil hole is positioned closer to the second opening side.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lubricating structure for a transmission, comprising:
   an axial hole formed penetrating through a gear shaft in an axial direction thereof and having a first opening at one axial end of the gear shaft for supplying therein a lubricant and a second opening at the other axial end of the gear shaft;
   a first oil hole provided on the gear shaft in a radial direction thereof to establish communication between the axial hole and an outside of the gear shaft; and
   a tapered groove provided on an inner wall of the axial hole of the gear shaft and extending in the axial direction thereof, the tapered groove being circumferentially limited, the tapered groove being gradually tapered from a first opening side towards a second opening side, wherein the lubricant is supplied to a portion needing lubrication via the axial hole or the lubricant is supplied to the portion needing lubrication via the axial hole and the first oil hole, and the depth of the tapered groove is deeper at the second opening side than that of the first opening side.

2. The lubricating structure for the transmission as set forth in claim 1, wherein the tapered groove is separately positioned from the first oil hole not to be in communication therewith.

3. The lubricating structure for the transmission as set forth in claim 2, further comprising:
   a second oil hole provided on the gear shaft in the radial direction thereof between the first opening and the second opening to establish communication between the tapered groove and the outside of the gear shaft for supplying the lubricant to the portion needing the lubrication.

4. The lubricating structure for the transmission as set forth in claim 1, further comprising:
   a second oil hole provided on the gear shaft in the radial direction thereof between the first opening and the second opening to establish communication between the tapered groove and the outside of the gear shaft for supplying the lubricant to the portion needing the lubrication.

5. The lubricating structure for the transmission as set forth in claim 4, wherein the second oil hole is positioned closer to the second opening side than the first oil hole is positioned closer to the second opening side.

6. The lubricating structure for the transmission as set forth in claim 3, wherein the second oil hole is positioned closer to the second opening side than the first oil hole is positioned closer to the second opening side.

7. A lubricating structure for a transmission comprising:
   a gear shaft possessing an axially extending hole open at one axial end of the gear shaft for supplying lubricant to the axially extending hole and open at the other axial end of the gear shaft, the gear shaft possessing an outer surface, the gear shaft also possessing an inner wall facing the axially extending hole;
   a first radially extending oil hole passing through the gear shaft and communicating the axially extending hole in the gear shaft with the outer surface of the gear shaft; and
   an axially extending groove on the inner wall of the gear shaft, the groove extending circumferentially over less than the entire circumferential extent of the inner wall, the groove gradually tapering in depth in the axial direction so that the groove is deeper at one axial end of the groove than at an other axial end of the groove, wherein the lubricant is supplied to a portion needing lubrication via the axially extending hole or the lubricant is supplied to the portion needing lubrication via the axially extending hole and the radially extending oil hole.

8. The lubricating structure for the transmission as set forth in claim 7, wherein the tapered groove is circumferentially spaced from the first radially extending oil hole so that first radially extending oil hole does not open into the tapered groove.

9. The lubricating structure for the transmission as set forth in claim 8, further comprising a second radially extending oil hole passing through the gear shaft and communicating the axially extending hole in the gear shaft with the outer surface of the gear shaft.

10. The lubricating structure for the transmission as set forth in claim 9, wherein the tapered groove is deeper towards the other axial end of the gear shaft than the one axial end of the gear shaft, and the second oil hole is positioned closer to the other axial end of the gear shaft than the first oil hole.

11. The lubricating structure for the transmission as set forth in claim 7, further comprising a second radially extending oil hole passing through the gear shaft and communicating the axially extending hole in the gear shaft with the outer surface of the gear shaft and positioned between the first opening and the second opening.

12. The lubricating structure for the transmission as set forth in claim 11, wherein the tapered groove is deeper towards the other axial end of the gear shaft than the one axial end of the gear shaft, and the second oil hole is positioned closer to the other axial end of the gear shaft than the first oil hole.

13. A lubricating structure for a transmission comprising:
   a gear shaft possessing an axially extending hole open at one axial end of the gear shaft for supplying lubricant to the hole and open at the other axial end of the gear shaft, the gear shaft possessing an outer surface, the gear shaft also possessing an inner wall facing the axially extending hole;
   an oil through hole extending from the outer surface of the gear shaft to the axially extending hole in the gear shaft to provide fluid communication between the axially extending hole in the gear shaft and outside the gear shaft;
   a groove on the inner wall of the gear shaft, the groove axially extending from one axial end towards another axial end of the axially extending groove, the groove extending over only a portion of the entire circumference of the inner wall; and
   the groove gradually tapering in depth so that the groove is deeper at the one axial end of the groove than at the other axial end of the groove.

14. The lubricating structure for the transmission as set forth in claim 13, wherein the tapered groove is circumferentially spaced from the oil through hole so that the oil through hole does not open into the tapered groove.

15. The lubricating structure for the transmission as set forth in claim 14, wherein the oil through hole is a first oil through hole, further comprising a second oil through hole extending from the outer surface of the gear shaft to the axially extending hole, the second oil through hole communicating the axially extending hole in the gear shaft with the outer surface of the gear shaft.

16. The lubricating structure for the transmission as set forth in claim 13, wherein the oil through hole is a first oil through hole, further comprising a second oil through hole extending from the outer surface of the gear shaft to the axially extending hole, the second oil through hole communicating the axially extending hole in the gear shaft with the outer surface of the gear shaft.

17. The lubricating structure for the transmission as set forth in claim 16, wherein the tapered groove is deeper towards the other axial end of the gear shaft than the one axial end of the gear shaft, and the second oil hole is positioned closer to the other axial end of the gear shaft than the first oil hole.

\* \* \* \* \*